(12) United States Patent
Carey et al.

(10) Patent No.: US 12,333,569 B2
(45) Date of Patent: *Jun. 17, 2025

(54) SYSTEMS AND METHODS FOR THIRD-PARTY SERVICE INTEGRATION IN AN APPLICATION

(71) Applicant: JPMORGAN CHASE BANK, N.A., New York, NY (US)

(72) Inventors: Dave Carey, Middletown, DE (US); Howard Spector, Street, MD (US); Peter G Costanzo, Dublin, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/364,316

(22) Filed: Aug. 2, 2023

(65) Prior Publication Data

US 2023/0377001 A1 Nov. 23, 2023

Related U.S. Application Data

(63) Continuation of application No. 18/061,720, filed on Dec. 5, 2022, now Pat. No. 11,776,012.

(Continued)

(51) Int. Cl.
*G06Q 30/02* (2023.01)
*G06Q 30/0207* (2023.01)
*G06Q 30/0251* (2023.01)

(52) U.S. Cl.
CPC ..... *G06Q 30/0261* (2013.01); *G06Q 30/0207* (2013.01)

(58) Field of Classification Search
CPC .................. G06Q 30/0261; G06Q 30/0207
See application file for complete search history.

(56) References Cited

U.S. PATENT DOCUMENTS 9,426,769 B2* 8/2016 Haro .................. H04W 4/021
2013/0332279 A1* 12/2013 Kuusela ............... G06Q 30/02
705/14.57

(Continued)

OTHER PUBLICATIONS

Jakl, Basics of AR: SLAM—Simultaneous Localization and Mapping, Aug. 14, 2018, https://www.andreasjakl.com/basics-of-ar-slam-simultaneous-localization-and-mapping/, pp. 1-16 (Year: 2018).*

(Continued)

*Primary Examiner* — John Van Bramer
(74) *Attorney, Agent, or Firm* — GREENBERG TRAURIG LLP (57) ABSTRACT

In some aspects, the techniques described herein relate to a method including: providing a host application that provides a native service of a host organization to an end user of the application, and wherein the application integrates and provides an augmented reality service of a third party to the end user of the application; determining, by the data center of the host organization, a location-relevant incentive offer based on location telemetry data; sending the location-relevant incentive offer to a data center of the third party; monitoring, by the data center of the third party, the physical location of the end user; sending to the augmented reality service, the location-relevant incentive offer; and presenting, by the augmented reality service and to the end user via the application, the location-relevant incentive offer when the end user is within a predefined proximity to a vendor associated with the location-relevant incentive offer.

20 Claims, 4 Drawing Sheets

Related U.S. Application Data

(60) Provisional application No. 63/265,014, filed on Dec. 6, 2021, provisional application No. 63/265,015, filed on Dec. 6, 2021.

(56) References Cited

U.S. PATENT DOCUMENTS

| | | | | |
|---|---|---|---|---|
| 2017/0336511 | A1* | 11/2017 | Nerurkar | G06T 7/55 |
| 2018/0084079 | A1* | 3/2018 | Williams | H04W 4/00 |
| 2021/0182795 | A1* | 6/2021 | Noel, Sr. | G06T 19/006 |
| 2021/0224055 | A1* | 7/2021 | Zhang | G06F 8/65 |
| 2021/0279766 | A1* | 9/2021 | Garrett | G06T 11/00 |

OTHER PUBLICATIONS

Kuprenko, How to develop a location-based Augmented Reality app, Jan. 20, 2021, https://www.geospatialworld.net/blogs/location-based-augmented-reality-app-development-a-complete-guide/, pp. 1-7 (Year: 2021).*

Carpingnoli, Build your Location-Based Augmented Reality Web App, Nov. 15, 2019, https://medium.com/chialab-open-source/build-your-location-based-augmented-reality-web-app-c2442e716564, p. 1-33 (Year: 2019).*

* cited by examiner

FIGURE 1

FIGURE 2 providing, by a host organization, an application, wherein the application provides a native service of the host organization to an end user of the application, and wherein the application integrates and provides a partner augmented reality service of a partner organization to the end user of the application
302 receiving, at the host organization backend and from the partner augmented reality service, location telemetry data, wherein the location telemetry data includes a physical location of the end user electronic device and a prompted route of travel of the end user and electronic device
304 determining, by the host organization backend, a location-relevant incentive offer based on the location telemetry data and the prompted route of travel
306 sending, by the host organization backend, the location-relevant incentive offer to the partner organization backend
308 monitoring, by the partner organization backend, the physical location of the end user electronic device
310 sending, by the partner organization backend and to the augmented reality service, the location-relevant incentive offer
312 presenting, by the augmented reality service and to the end user via the host app, the location-relevant incentive offer when the end user is within a predefined proximity to a vendor/merchant associated with the location-relevant incentive offer
314

SYSTEMS AND METHODS FOR THIRD-PARTY SERVICE INTEGRATION IN AN APPLICATION

RELATED APPLICATIONS

This application is a continuation of U.S. patent application Ser. No. 18/061,720, filed Dec. 5, 2022, now U.S. Pat. No. 11,776,012, which claims the benefit of U.S. Provisional Patent Application Ser. No. 63/265,015, filed Dec. 6, 2021, and U.S. Provisional Patent Application Ser. No. 63/265,014, filed Dec. 6, 2021, the disclosures of each of which are hereby incorporated, by reference, in their entirety.

BACKGROUND

1. Field of the Invention

Aspects are generally related to systems and methods for third-party service integration in an application.

2. Description of the Related Art

A host application (also referred to herein as a "host app" and commonly known as a "super app") aggregates the services provided by many applications into a single application through third-party integration. Developers of host apps, however, can face technical challenges when attempting to seamlessly integrate many third-party services into a single application.

SUMMARY

In some aspects, the techniques described herein relate to a method including: providing, by a host organization, an application, wherein the application provides a native service of the host organization to an end user of the application, and wherein the application integrates and provides an augmented reality service of a third party to the end user of the application; receiving, at a data center of the host organization and from the augmented reality service, location telemetry data, wherein the location telemetry data includes a physical location of the end user and an expected route of travel of the end user; determining, by the data center of the host organization, a location-relevant incentive offer based on the location telemetry data; sending, by the data center of the host organization, the location-relevant incentive offer to a data center of the third party; monitoring, by the data center of the third party, the physical location of the end user; sending, by the data center of the third party and to the augmented reality service, the location-relevant incentive offer; and presenting, by the augmented reality service and to the end user via the application, the location-relevant incentive offer when the end user is within a predefined proximity to a vendor associated with the location-relevant incentive offer.

In some aspects, the techniques described herein relate to a method, wherein the application is a mobile application.

In some aspects, the techniques described herein relate to a method, wherein the expected route of travel of the end user is based on a goal defined by the augmented reality service.

In some aspects, the techniques described herein relate to a method, including: providing, by the augmented reality service, an incentive token within an interface of the augmented reality service and along the expected route of travel of the end user.

In some aspects, the techniques described herein relate to a method, wherein the incentive token within the interface of the augmented reality service is associated with a real-world physical location.

In some aspects, the techniques described herein relate to a method, wherein the real-world physical location is expressed as a GPS coordinate.

In some aspects, the techniques described herein relate to a method, including: crediting the incentive token to the end user when the end user moves within a predefined proximity of the real-world physical location.

In some aspects, the techniques described herein relate to a system including a host organization computer including at least one processor, a third-party computer including at least one processor, and an application, wherein: the application is provided by a host organization, the application provides a native service of the host organization to an end user of the application, and wherein the application integrates and provides an augmented reality service of a third party to the end user of the application; the host organization computer receives from the augmented reality service, location telemetry data, wherein the location telemetry data includes a physical location of the end user and an expected route of travel of the end user; the host organization computer determines a location-relevant incentive offer based on the location telemetry data; the host organization computer sends the location-relevant incentive offer to a data center of the third party; the third-party computer monitors the physical location of the end user; the third-party computer sends to the augmented reality service, the location-relevant incentive offer; and the augmented reality service presents to the end user via the application, the location-relevant incentive offer when the end user is within a predefined proximity to a vendor associated with the location-relevant incentive offer.

In some aspects, the techniques described herein relate to a system, wherein the application is a mobile application.

In some aspects, the techniques described herein relate to a system, wherein the expected route of travel of the end user is based on a goal defined by the augmented reality service.

In some aspects, the techniques described herein relate to a system, wherein the augmented reality service provides an incentive token within an interface of the augmented reality service and along the expected route of travel of the end user.

In some aspects, the techniques described herein relate to a system, wherein the incentive token within the interface of the augmented reality service is associated with a real-world physical location.

In some aspects, the techniques described herein relate to a system, wherein the real-world physical location is expressed as a GPS coordinate.

In some aspects, the techniques described herein relate to a system, wherein the augmented reality service credits the incentive token to the end user when the end user moves within a predefined proximity of the real-world physical location.

In some aspects, the techniques described herein relate to a non-transitory computer readable storage medium, including instructions stored thereon, which instructions, when read and executed by one or more computer processors, cause the one or more computer processors to perform steps including: providing, by a host organization, an application, wherein the application provides a native service of the host organization to an end user of the application, and wherein the application integrates and provides an augmented reality service of a third party to the end user of the application; receiving, at a data center of the host organization and from the augmented reality service, location telemetry data, wherein the location telemetry data includes a physical location of the end user and an expected route of travel of the end user; determining, by the data center of the host organization, a location-relevant incentive offer based on the location telemetry data; sending, by the data center of the host organization, the location-relevant incentive offer to a data center of the third party; monitoring, by the data center of the third party, the physical location of the end user; sending, by the data center of the third party and to the augmented reality service, the location-relevant incentive offer; and presenting, by the augmented reality service and to the end user via the application, the location-relevant incentive offer when the end user is within a predefined proximity to a vendor associated with the location-relevant incentive offer.

In some aspects, the techniques described herein relate to a non-transitory computer readable storage medium, wherein the application is a mobile application.

In some aspects, the techniques described herein relate to a non-transitory computer readable storage medium, wherein the expected route of travel of the end user is based on a goal defined by the augmented reality service.

In some aspects, the techniques described herein relate to a non-transitory computer readable storage medium, including: providing, by the augmented reality service, an incentive token within an interface of the augmented reality service and along the expected route of travel of the end user.

In some aspects, the techniques described herein relate to a non-transitory computer readable storage medium, wherein the incentive token within the interface of the augmented reality service is associated with a real-world physical location.

In some aspects, the techniques described herein relate to a non-transitory computer readable storage medium, wherein the real-world physical location is expressed as a GPS coordinate, and including: crediting the incentive token to the end user when the end user moves within a predefined proximity of the real-world physical location.

In some aspects, the techniques described herein relate to a method including: providing, by a host organization, an application, wherein the application provides a native service of the host organization to an end user of the application, and wherein the application integrates and provides a third-party service of a third party to the end user of the application; receiving, at a data center of the host organization, native telemetry data, wherein the native telemetry data is based on use of the application by the end user; receiving, at the data center of the host organization, third-party telemetry data from the third party, wherein the third-party telemetry data is based on use of the third-party service by the end user; processing the native telemetry data and the third-party telemetry data to determine patterns associated with the end user; and providing, via the application, incentive offers to the end user based on the determined patterns associated with the end user.

DETAILED DESCRIPTION

Aspects are generally related to systems and methods for third-party service integration in an application.

A host application (also known as a "super application" or "super app," and referred to herein as a "host app," "host," "super app," or "hosting app") aggregates the services of many applications from many providers into a single application (i.e., the host app) through multi-party integration. A host app acts as a portal, a single access point, to the services provided by partners of a host organization that provides the host app. The host app can be said to host the partners' applications or services by integrating these applications and services into a single hosting application. Additionally, the host app may offer native services and functionality related to the host organization's business.

Aside from preventing user fatigue and promoting efficiency, host apps can offer other advantages over accessing services through separate, individual applications. These include less maintenance (e.g., a user and a provider must keep only one application updated, as opposed to several), better security (e.g., a user generally must remember only a single set of login credentials to access the variety of services offered through the hosting app), less resource usage (e.g., a mobile device uses less memory to execute the single host app while offering all of the integrated services provided therein), etc.

Seamless integration of partner applications, however, is a significant factor in the adoption of a host app by end users. This can pose technical challenges in the process of providing incentive offers to end users, since partners whose services have been integrated into the hosting app still maintain their own backend systems for data storage and processing related to their services that are integrated into the host app. Likewise, the host organization also maintains systems for driving the host application and processing and storing data related to native services offered through the host app by the host organization. Systems and methods designed for robust data sharing and interaction between partners' systems and a host organization's systems are needed to tightly integrate disparate systems and data and provide meaningful incentive offers to end users.

In accordance with aspects, partner applications/services may be embedded in a host app using a hybrid web application approach. A Hybrid web application combines elements of both native (host) applications and web applications to effectively integrate third-party services. A hybrid web application uses front-end development technologies and protocols such as JavaScript®, HTML5, CSS to provide cross-platform functionality between a host app and an embedded third-party application/service.

Figure 1:
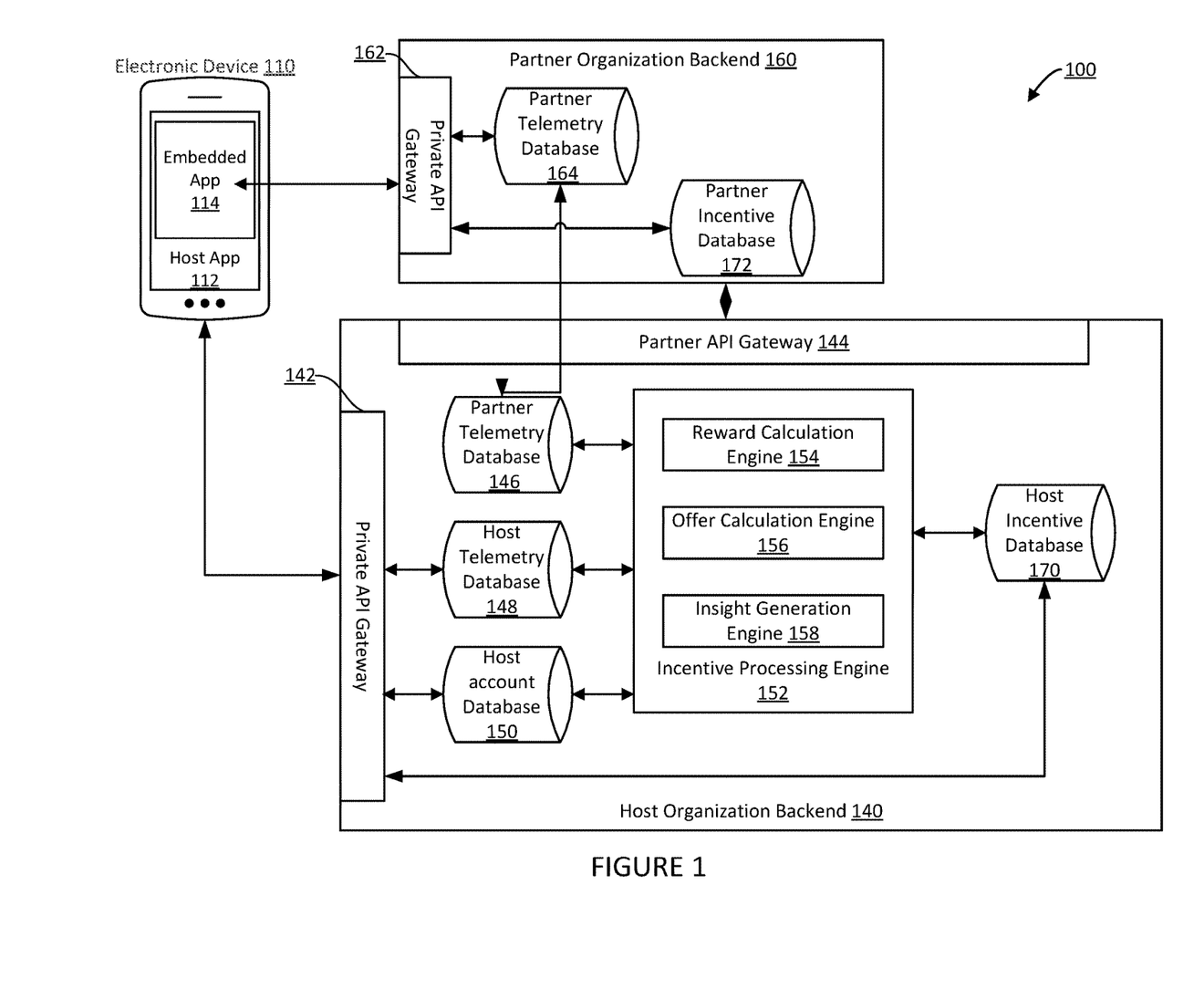
FIG. 1 is a block diagram of a system for third-party service integration in an application, in accordance with aspects.

FIG. 1 is a block diagram of a system for third-party service integration in an application, in accordance with aspects. FIG. 1 includes electronic device 110, which stores and executes host app 112. Electronic device 110 may be a smart phone, a tablet computer, a laptop computer, or any mobile electronic device that is capable of storing and executing a computer application such as host app 112. Host app 112 is a computer application configured as a "hosting" or "super" application, as described herein. Host app 112 may be a mobile application optimized for execution on a mobile computing device. Embedded in host app 112 is embedded app 114. Embedded app 114 is also a computer application and is provided by a third-party partner of the hosting organization. Embedded app 114 is embedded into host app 112 and services offered by embedded app 114 are integrated with, and delivered through host app 112. Embedded app 114 can be accesses by a user of electronic device 110 via host app 112.

Host app 112 is configured to be in operative communication with host organization backend 140. Embedded app 114 is configured to be in operative communication with partner organization backend 160. Host organization backend 140 and partner organization backend 160 represent the backend technology infrastructures of these respective organizations. Such technology infrastructures include servers, computers, software applications, computer network mediums, and computer networking hardware and software for providing electronic services based on computer software applications executing on requisite hardware. Exemplary hardware and software include webservers, application servers, database servers and database engines, communication servers such as email servers and SMS servers, network routers, switches and firewalls, custom-developed software applications (i.e., computer applications) including hardware to execute such applications on, etc. Host organization backend 140 and partner organization backend 160 may provide data storage and processing operations for use by these respective organizations and may include one or more data centers of an organization.

In accordance with aspects, systems described herein may provide one or more application programming interfaces (APIs) in order to facilitate communication with related/provided applications and/or among various public or partner technology backends, data centers, or the like. APIs may publish various methods and expose the methods via API gateways. A published API method may be called by an application that is authorized to access the published API methods. API methods may take data as one or more parameters of the called method. API access may be governed by an API gateway associated with a corresponding API. Incoming API method calls may be routed to an API gateway and the API gateway may forward the method calls to internal API servers that may execute the called method, perform processing on any data received as parameters of the called method, and send a return communication to the method caller via the API gateway. A return communication may also include data based on the called method and its data parameters.

API gateways may be public or private gateways. A public API gateway may accept method calls from any source without first authenticating or validating the calling source. A private API gateway may require a source to authenticate or validate itself via an authentication or validation service before access to published API methods is granted. APIs may be exposed via dedicated and/or private communication channels such as private computer networks, or may be exposed via public communication channels such as a public computer network (e.g., the internet). APIs, as discussed herein, may be based on any suitable API architecture. Exemplary API architectures and/or protocols include SOAP (Simple Object Access Protocol), XML-RPC, REST (Representational State Transfer), or the like.

Host app 112 may be configured for operative communication with host organization backend 140 via private API gateway 142. Private API gateway 142 may be associated with an API and corresponding published methods exposed by host organization backend 140. Private API gateway 142 may be a private API. That is, private API gateway 142 may only be exposed to, and accessible by, instances of host app 112. Private API gateway 142 may be configured to facilitate communication between host app 112 and host organization backend 140 via API methods that can be called by host app 112. API methods may take specified data types as parameters of a called method and may pass the method parameters to processing and storage systems of host organization backend 140. Likewise, embedded app 114 may be configured for operative communication with partner organization backend 160 via private API gateway 162, which may also be a private API gateway and function as described herein.

In accordance with aspects, host organization backend 140 and partner organization backend 160 may also be in operative communication with each other via an API gateway. Partner API gateway 144 is depicted in FIG. 1 as hosted by host organization backend 140 and accessed via partner organization backend 160, but other aspects my include hosting of the API gateway by partner organization backend 160 with host organization backend 140 accessing. Partner API gateway 144 may be a semi-public API that is published for use with/by multiple parties (but not necessarily open to public calls), or it may be a private API that is custom configured for communications with a single partner (e.g., with partner organization backend 160).

Host organization backend 140 includes host account database 150, and host telemetry database 148. Host account database 150 may store data related to end users of host app 112. For example, host account database 150 may store personal information, login credentials, etc. Host telemetry database 148 may store telemetry data based on an end user's use of host app 112. Additionally, host organization backend 140 includes partner telemetry database 146. Partner telemetry database 146 may store telemetry data received from partner organization backend 160. Telemetry data stored in partner telemetry database 146 may be telemetry data received via partner API gateway 162 based on an end user's use of embedded app 114. Telemetry data may be shared from partner organization backend 160 with host organization backend 140 via partner API gateway 144.

In accordance with aspects, telemetry data is any data that is based on an end user's in-application activity. This includes in-app transactions, browsing, search terms and strings, feedback, time spent using apps or services, geo-location of a user while using apps or services, etc.

With continued reference to FIG. 1, host organization backend 140 may additionally include incentive processing engine 152. Incentive processing engine 152 may include reward calculation engine 154, offer calculation engine 156, and insight generation engine 158. Incentive processing engine 152, including reward calculation engine 154, calculation engine 156, and insight generation engine 158 may include computer applications executing instructions/logic on appropriate hardware, and may be referred to as processing modules herein. The processing modules of incentive processing engine 152 may receive and process data from each of partner telemetry database 146, host telemetry database 148, and host account database 150, and may generate, based on the received data, incentive offers directed at an end user of host app 112 and/or embedded app 114. Incentive offers generated by incentive processing engine 152 and the processing modules included therein may be stored in host incentive database 170. Host incentive database may be in operative communication with partner organization backend 160 and may be configured to share incentive offers via partner API gateway 144 with partner organization backend 160. Partner organization backend 160 may store received incentive offers in partner incentive database 172. Partner incentive database 172 may be configured to send incentive offers to embedded app 114 via private API gateway 162.

In accordance with aspects, a host organization may collect telemetry data generated by a host application provided by the host organization. Additionally, a partner organization that partners with the host organization may collect telemetry data generated by an application provided by the partner organization. The application provided by the partner organization may be embedded in the host application (referred to herein as an "embedded application"). The partner organization may collect telemetry data based on the end user's use of the partner's provided application that is integrated into the host app. The host organization may collect telemetry data based on the end user's use of native services provided by the host organization in the host app, but may also collect telemetry data related to the end user's use of partner services provided via the host app. By combining and processing the telemetry data collected by both a partner organization and that collected by a host organization, the host organization can provide meaningful incentive offers to end users.

Figure 2:
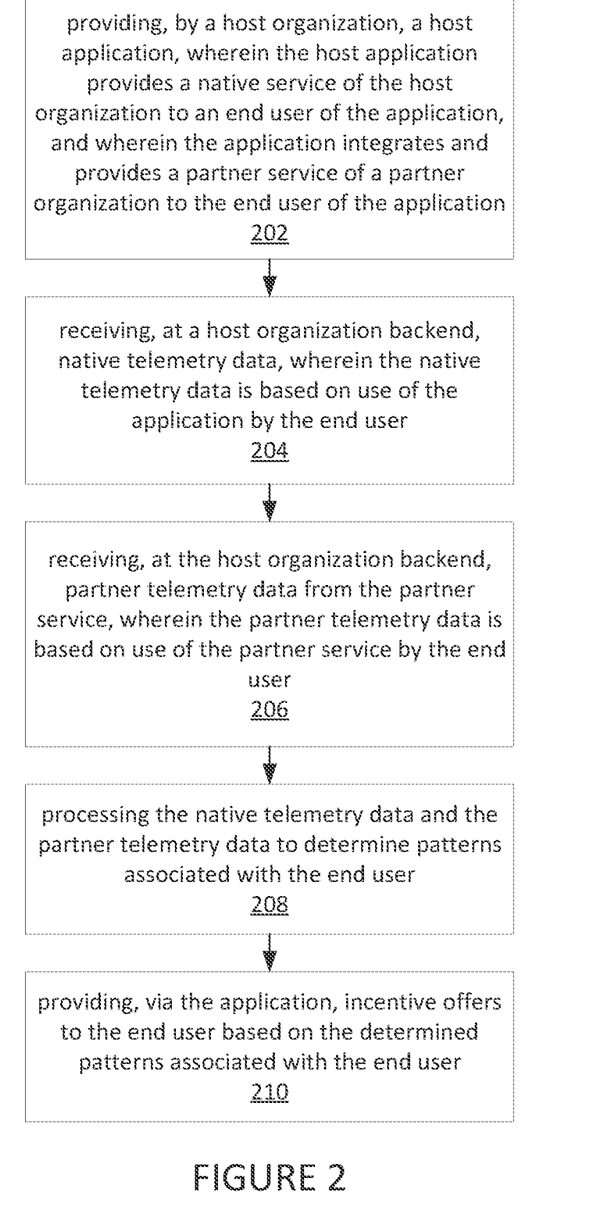
FIG. 2 is a flow chart for providing third-party service integration in an application, in accordance with aspects.

FIG. 2 is a flow chart for providing third-party service integration in an application, in accordance with aspects.

At block 202 of FIG. 2, a host organization provides a host application. The host application, or host app, may be a mobile application or other computer application that is configured to execute on an ecteronic device of an end user. The host app is configured to provide a native service of the host organization to an end user of the application. The host app is also configured to embed a partner app in the host app. The partner app may be configured to provide a native service of a partner organization to the end user of the application via the host app.

At block 204 of FIG. 2, native telemetry data collected from the host app is received at a host organization backend. The telemetry data may be received at the host organization backend via an API method call to an API gateway exposed by the host organization backend. The native telemetry data may be based on the user's use of the host app, and may also be based on the user's use of the native service provided by the host organization via the host app.

At block 206 of FIG. 2, partner telemetry data collected by the embedded partner app is received at the host organization's data center. The third-party telemetry data is based on an end user's use of the embedded partner app that is embedded in the host app, and may also be based on the partner service provided by the embedded app. The embedded app may be in operative communication with a backend technology infrastructure of the partner organization and may provide the partner telemetry data to the partner organization backend via a private API gateway provided by the partner organization. The partner organization may receive the partner telemetry data and may store the partner telemetry data in a suitable data store of the partner organization backend.

The partner organization backend may be configured to share the partner telemetry data with a host organization (e.g., the host organization that provides the host app in which the partner app is embedded). The partner organization may share partner telemetry data from a partner telemetry database with the host organization via a partner API gateway. Method calls from the partner API gateway may include API method calls that include telemetry data of a user of the host app (and the embedded partner app, by extension), and a unique identifier of a user. The host organization may store the partner telemetry data in a database resident at the host organization backend. The telemetry data may be stored with a relationship to account information that is also stored at the host organization backend. A relationship linking telemetry data to user account information allows telemetry data to be retrieved and processed in the context of the user and allows generated incentive data to be sent to the user whose in-application activity generated the telemetry data.

At block 208 of FIG. 2, the native telemetry data and the third-party telemetry data are processed at the host organization's data center to determine patterns associated with the end user. The patterns are used to generate incentive data including rewards, offers, and insights that can be sent to the relevant user (i.e., the user whose in-application activity was the basis for the telemetry data).

At block 210 of FIG. 2, the end user is provided with the generated incentive offers based on the determined patterns associated with the end user. The host organization may store the generated incentive offers in a local data store and may send the generated offers via a private API gateway, or other in-band or out-of-band communication channels, configured for communication with a provided host app. In some aspects, incentive offers may be delivered to a use via out-of-band channels such as SMS messages, emails, etc.

In accordance with aspects, the host organization may collect similar telemetry data as a partner organization collects (i.e., native telemetry data), and perform comparisons between the native telemetry data and the third-party telemetry data to confirm that partner services are being accessed through the embedded partner app integrated in the host app. Comparison of telemetry data received from a partner organization (which telemetry data may have been generated by an embedded application) with native telemetry data received directly from a host app allows a host organization to validate the accuracy and authenticity of telemetry data received from a partner organization.

Telemetry data received from a partner organization may include attributes such as time stamps, location stamps, etc. A host organization may find similar native telemetry data having similar identifying attributes and compare the native telemetry data to the received partner telemetry data. For instance, given a user GPS location received from a partner as telemetry data, a host organization may query a local telemetry database to find a native GPS location received from a host app, and may validate the partner location telemetry if the native GPS location data for a similar timestamp is the same or in close proximity to the partner GPS telemetry data.

In accordance with aspects, the host organization can pass data related to the proffered incentive offers back to partner organizations for use by the partner organizations, e.g., with an app embedded in the host organization's host app.

In accordance with aspects, a host app may provide, as a partner service integrated and embedded into the host app, an augmented reality (AR) service or a virtual reality (VR) service. An augmented reality service is an interactive experience of a real-world environment where the objects that reside in the real world are enhanced by computer-generated perceptual information. Accordingly, an AR service can be defined as a combination of the real world and a virtual world, real-time interaction, and 3-dimensional registration of virtual and real objects. In contrast, in a VR service an end-user is immersed in a purely virtual environment without augmentation from real-world objects.

An AR service may instruct end-users to go to places in the physical world and perform certain actions. The certain actions may involve virtual objects that the end user virtually interacts with. For example, an AR service may instruct an end user to find and collect a virtual token at a particular physical location. The virtual token may not appear in the virtual environment (e.g., the host app) for collection until the user is at or in close proximity to the specified physical location. In this way, AR services can influence the physical location of end users.

Moreover, AR services can influence the route an end user takes to arrive at a specified physical location. For instance, if there are multiple routes an end user may take to arrive at the specified physical location, the AR service may provide incentives to take a particular one of those routes. For instance, the AR service may provide a trail of several virtual tokens that the user must collect in a particular order to complete a defined goal of the AR service. The AR service may assign the order of collection and may position the physical-location collection points of the virtual tokens in such a way that a particular physical route must be travelled by the end user in order to collect the virtual tokens in the assigned order. AR services offer opportunities for host and partner organizations to present location-relevant incentive offers to end users via a host app.

An end user of a host app may interact with an AR service provided by a partner app that is embedded/integrated into the host app. The AR service may send telemetry data to the data center of partner organization. The telemetry data may include the end user's physical location as determined by a global positioning system (GPS) module on the end user's electronic device executing the host app. Based on the end user's physical location, the AR service app may determine a route for the end user to travel while interacting with the AR service integrated into the host app.

In accordance with aspects, the AR service may be communicating the end user's present physical location and a determined route that the end user will be presented with in order successfully complete tasks/assignments provided to the end user of the AR service. That is, the AR service may be configured to communicate a route that the end user will be prompted to take, and a destination of the route. The AR service may be configured to communicate the route and destination data to a partner organization's backend technology infrastructure via an embedded partner application that provides the AR service and is embedded in a host app. The AR service may also be configured to pass the route and destination information to the host application, and the host application may be configured to communicate the route and destination data to the host organization's technology infrastructure backend.

A host organization backend may receive and process the route and destination data to determine location-relevant incentive offers that are along the end user's route of travel as determined by the AR service. The location-relevant incentive offers may, in turn, be presented to the end user via a user interface (e.g., a graphical user interface (GUI)) of the host app when the end user is at or in close proximity to the business/vendor where the location-relevant incentive offer may be redeemed. The host app may periodically send a GPS location determined by the user's electronic device (e.g., a mobile device including a GPS tracking application) to the host organization's backend. The host organization's backend may store a location of a business/vendor/merchant that is along the communicated route or near the communicated destination. When the GPS location received from the user's electronic device is determined to be within a predetermined proximity of the stored physical location of the merchant, the host organization backend may communicate an incentive offer associated with the merchant to the host app, and the host app may display the incentive offer to the user via an interface of the host app.

In an alternative aspect, when the host organization's backend infrastructure determines a location-relevant incentive offer along the predicted route of the end user, it can send the location-relevant offer to the partner organization backend, along with information identifying the vendor/merchant where the offer can be redeemed, and information associating the offer with the end user. The partner organization backend may continue to monitor the end user's position along the predicted route of travel according to the AR service and using the GPS tracking techniques discussed above. As the user approaches the vendor, the partner's data center may send the location-relevant incentive offer to the AR service for presentation to the end user, such that the end user receives the location-relevant incentive offer while in close proximity to the relevant vendor.

In another aspect, the host organization backend may receive location data from a GPS tracking application of a user electronic device via a host application executing on the electronic device and an API or other communication channel. The host organization backend may provide a partner organization backend with a location-relevant incentive offer that is near the end user's physical location. The partner organization backend may determine a route that, if followed by the end user, will take the end user past the relevant vendor or the location-relevant incentive offer. The partner organization backend may then send the determined route to the AR service provided by an embedded application of the partner organization. The embedded application may be embedded in the host app and may integrate an AR service with the host app. The AR service may generate an AR route along the received route, and the end user may be prompted to follow the AR route as a condition to completing a goal defined by the AR service. As the end user progresses along the AR route and nears the location of a merchant associated with the location-relevant incentive offer, the AR service of the embedded partner app may present the location-relevant incentive offer to the user via an interface of the host app.

Figure 3:
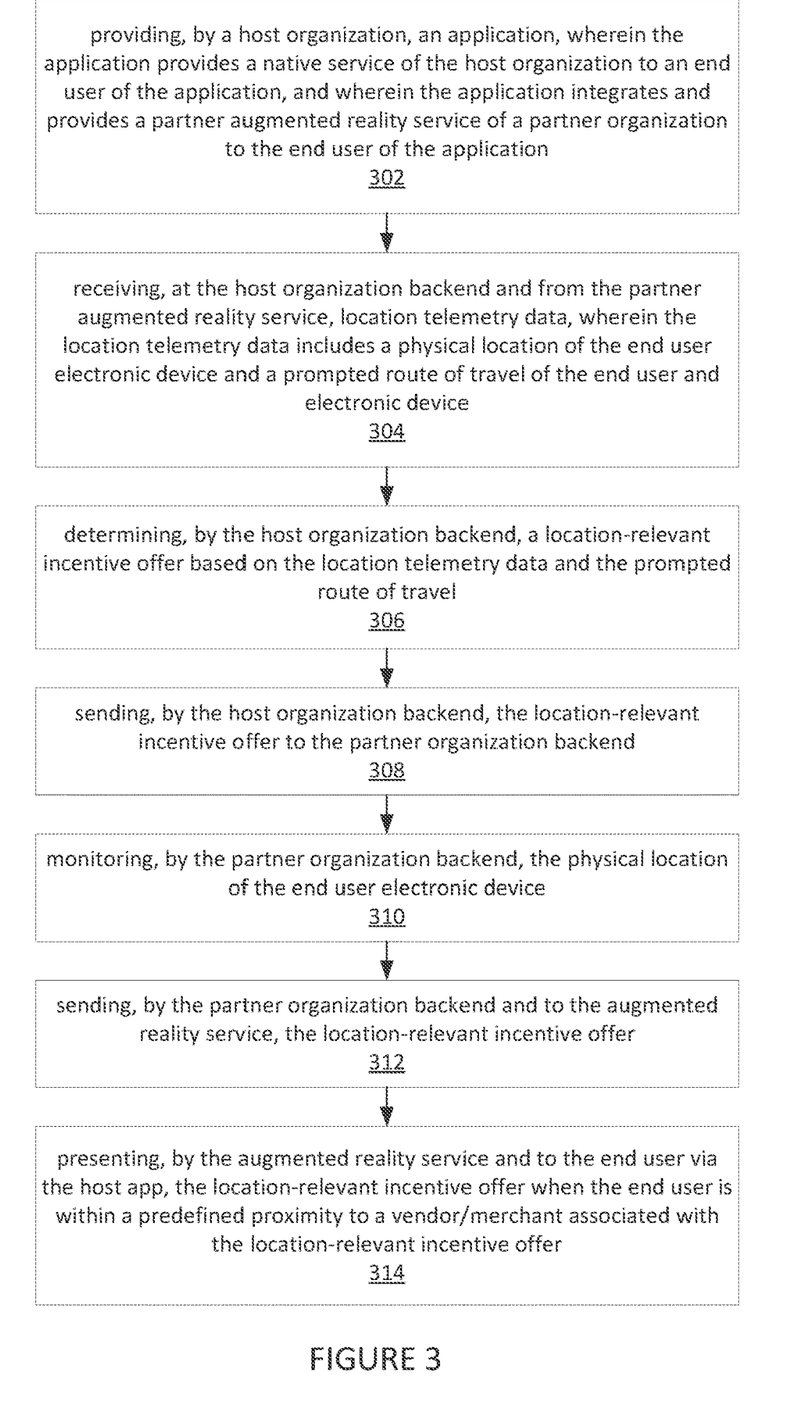
FIG. 3 is a flow chart for third-party augmented reality service integration in an application, in accordance with aspects.

FIG. 3 is a flow chart for third-party augmented reality service integration in an application, in accordance with aspects.

At block 302, a host organization provides a host application (a host app). The application provides a native service of the host organization to an end user of the application. The application also embeds a partner application (a partner app) and the partner app integrates an augmented reality (AR) service provided by the partner organization to the end user of the host app.

At block 304, location telemetry data from the AR service is received at the host organization backend. The location telemetry data may include a physical location of the end user and an expected route of travel of the end user. The location telemetry data may be collected by the AR service from a GPS location application provided by, e.g., an operating system of the user's electronic device. The AR service may be shared with the host app, and the host app may communicate the location telemetry data to the host organization backend.

At block 306, the host organization backend determines a location-relevant incentive offer based on the location telemetry data.

At block 308, the host organization backend sends the location-relevant incentive offer to the partner organization backend.

At block 310, the partner organization backend monitors the end user's physical location. This may be done by receiving periodic GPS location updates from the AR service and/or the embedded app.

At block 312, the partner organization backend sends the location-relevant incentive offer to the augmented reality service when the location of the user is determined to be within a predefined distance of a merchant/vendor associated with the location-relevant incentive offer.

At block 314, the augmented reality service presents the location-relevant incentive offer to the end user via the host app, when the end user is in close proximity to a vendor associated with the location-relevant incentive offer.

The various processing steps and/or data flows depicted in the figures and described in greater detail herein may be accomplished using some or all of the system components described also described herein. In some implementations, the described may be performed in different sequences and various steps may be omitted. Additional steps may be performed along with some or all of the steps shown in the depicted flow diagrams. Some steps may be performed simultaneously. Accordingly, the logical flows illustrated in the figures and described in greater detail herein) are meant be exemplary and, as such, should not be viewed as limiting. These logical flows may be implemented in the form of executable instructions stored on a machine-readable storage medium and/or in the form of electronic circuitry.

Figure 4:
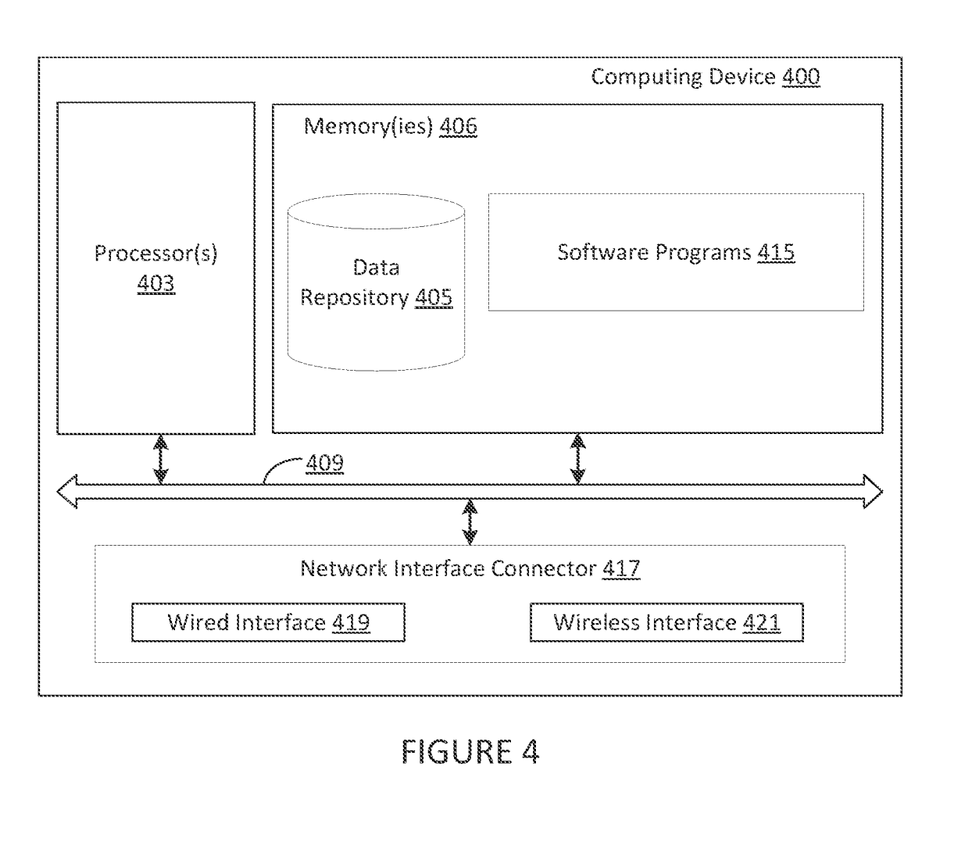
FIG. 4 is a block diagram of a computing device for implementing certain aspects of the present disclosure.

FIG. 4 is a block diagram of a computing device for implementing certain aspects of the present disclosure. FIG. 4 depicts exemplary computing device 400. Computing device 400 may represent hardware that executes the logic that drives the various system components described herein. For example, system components such servers, database engines, processing engines, electronic devices, and various other components of an organization's technology infrastructure backend, may include, and/or execute on, components and configurations like, or similar to, computing device 400. Computing device 400 includes a processor 403 coupled to a memory 406. Memory 406 may include volatile memory and/or persistent memory. The processor 403 executes computer-executable program code stored in memory 406, such as software programs 415. Software programs 415 may include one or more of the logical steps disclosed herein as a programmatic instruction, which can be executed by processor 403. Memory 406 may also include data repository 405, which may be nonvolatile memory for data persistence. The processor 403 and the memory 406 may be coupled by a bus 409. In some examples, the bus 409 may also be coupled to one or more network interface connectors 417, such as wired network interface 419, and/or wireless network interface 421. Computing device 400 may also have user interface components, such as a screen for displaying graphical user interfaces and receiving input from the user, a mouse, a keyboard and/or other input/output components (not shown).

The various processing steps and/or data flows depicted in the figures and described in greater detail herein may be accomplished using some or all of the system components also described herein. In some implementations, the described logical steps may be performed in different sequences and various steps may be omitted. Additional steps may be performed along with some, or all of the steps shown in the depicted logical flow diagrams. Some steps may be performed simultaneously. Accordingly, the logical flows illustrated in the figures and described in greater detail herein are meant to be exemplary and, as such, should not be viewed as limiting. These logical flows may be implemented in the form of executable instructions stored on a machine-readable storage medium and executed by a micro-processor (e.g., a computer application or a computer program) and/or in the form of statically or dynamically programmed electronic circuitry.

Hereinafter, general aspects of implementation of the systems and methods of the invention will be described.

The system of the invention or portions of the system of the invention may be in the form of a "processing machine," "computing device" or an "electronic device" such as a general-purpose computer, a computer server, a host machine, etc. As used herein, the term "processing machine," "computing device" or "electronic device" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a "program," "software program," "application," "computer application," "software," or the like. In one aspect, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example. The processing machine used to implement the invention may utilize a suitable operating system, and instructions may come directly or indirectly from the operating system.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further aspect of the invention, be performed by a single component. Further, the processing performed by one distinct component as described above may be performed by two distinct components. In a similar manner, the memory storage performed by two distinct memory portions as described above may, in accordance with a further aspect of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various aspects of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some aspects of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many aspects and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary aspects, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such aspects, adaptations, variations, modifications, or equivalent arrangements.

The invention claimed is:

1. A method comprising:
providing, by a host organization, an application, wherein the application provides a native service of the host organization to an end user of the application, and wherein the application embeds and provides a partner service of a third party to the end user of the application, wherein the partner service is an augmented reality service;
receiving, at a data center of the host organization and from the native service of the host organization, native telemetry data;
receiving, at the data center of the host organization and from a data center of the third party, partner telemetry data, wherein the partner telemetry data is collected by the partner service of the third party;
performing, at the data center of the host organization, a comparison of the native telemetry data to the partner telemetry data, wherein the comparison provides a validation of accuracy of the partner telemetry data with respect to the native telemetry data;
generating, based on the validation, an incentive offer based on the native telemetry data and the partner telemetry data; and
transmitting the incentive offer to the data center of the third party.

2. The method of claim 1, wherein the data center of the third party transmits the incentive offer to the partner service for display on an interface of an electronic user device.

3. The method of claim 2, wherein the native telemetry data and the partner telemetry data includes a physical location of the electronic user device.

4. The method of claim 3, wherein the physical location is expressed as a GPS coordinate.

5. The method of claim 4, wherein the incentive offer is associated with a real-world physical location.

6. The method of claim 5, wherein the incentive offer is transmitted for display on the interface of the electronic user device when the physical location of the electronic user device is within a predefined proximity of the real-world physical location.

7. The method of claim 6, wherein the partner service is an augmented reality service.

8. A system comprising at least one computer including a processor and a memory, wherein the at least one computer comprises a data center of a host organization and is configured to:
communicate with an application, wherein the application provides a native service of the host organization to an end user of the application, and wherein the application embeds and provides a partner service of a third party to the end user of the application, wherein the partner service is an augmented reality service;
receive, at a data center of the host organization and from the native service of the host organization, native telemetry data;
receive, at the data center of the host organization and from a data center of the third party, partner telemetry data, wherein the partner telemetry data is collected by the partner service of the third party;
perform, at the data center of the host organization, a comparison of the native telemetry data to the partner telemetry data, wherein the comparison provides a validation of accuracy of the partner telemetry data with respect to the native telemetry data;
generate, based on the validation, an incentive offer based on the native telemetry data and the partner telemetry data; and
transmit the incentive offer to the data center of the third party.

9. The system of claim 8, wherein the data center of the third party transmits the incentive offer to the partner service for display on an interface of an electronic user device.

10. The system of claim 9, wherein the native telemetry data and the partner telemetry data includes a physical location of the electronic user device.

11. The system of claim 10, wherein the physical location is expressed as a GPS coordinate.

12. The system of claim 11, wherein the incentive offer is associated with a real-world physical location.

13. The system of claim 12, wherein the incentive offer is transmitted for display on the interface of the electronic user device when the physical location of the electronic user device is within a predefined proximity of the real-world physical location.

14. The system of claim 13, wherein the partner service is an augmented reality service.

15. A non-transitory computer readable storage medium, including instructions stored thereon, which instructions, when read and executed by one or more computer processors, cause the one or more computer processors to perform steps comprising:
providing, by a host organization, an application, wherein the application provides a native service of the host organization to an end user of the application, and wherein the application embeds and provides a partner service of a third party to the end user of the application, wherein the partner service is an augmented reality service;
receiving, at a data center of the host organization and from the native service of the host organization, native telemetry data;
receiving, at the data center of the host organization and from a data center of the third party, partner telemetry data, wherein the partner telemetry data is collected by the partner service of the third party;
performing, at the data center of the host organization, a comparison of the native telemetry data to the partner telemetry data, wherein the comparison provides a validation of accuracy of the partner telemetry data with respect to the native telemetry data;
generating, based on the validation, an incentive offer based on the native telemetry data and the partner telemetry data; and transmitting the incentive offer to the data center of the third party.

16. The non-transitory computer readable storage medium of claim 15, wherein the data center of the third party transmits the incentive offer to the partner service for display on an interface of an electronic user device.

17. The non-transitory computer readable storage medium of claim 16, wherein the native telemetry data and the partner telemetry data includes a physical location of the electronic user device.

18. The non-transitory computer readable storage medium of claim 17, wherein the physical location is expressed as a GPS coordinate.

19. The non-transitory computer readable storage medium of claim 18, wherein the incentive offer is associated with a real-world physical location.

20. The non-transitory computer readable storage medium of claim 19, wherein the incentive offer is transmitted for display on the interface of the electronic user device when the physical location of the electronic user device is within a predefined proximity of the real-world physical location.

* * * * *